US005710930A

United States Patent [19]

Laney et al.

[11] Patent Number: 5,710,930
[45] Date of Patent: Jan. 20, 1998

[54] APPARATUS AND A METHOD FOR ALLOWING AN OPERATING SYSTEM OF A COMPUTER SYSTEM TO PERSIST ACROSS A POWER OFF AND ON CYCLE

[75] Inventors: Clifton W. Laney, Beaverton, Oreg.; Larry M. Leszczynski, Rocklin; Mary J. Madison, Pollock Pines, both of Calif.

[73] Assignee: Intel Corporation, Santa Clara, Calif.

[21] Appl. No.: 511,263

[22] Filed: Aug. 4, 1995

[51] Int. Cl.[6] ............................................. G06F 1/32
[52] U.S. Cl. .................................... 395/750; 395/830
[58] Field of Search ............................. 395/750, 830, 395/839

[56] References Cited

U.S. PATENT DOCUMENTS

| 5,014,193 | 5/1991 | Garner et al. | 395/830 |
|---|---|---|---|
| 5,126,541 | 6/1992 | Shinagawa | 395/438 |
| 5,386,552 | 1/1995 | Garney | 395/575 |
| 5,410,713 | 4/1995 | White et al. | 395/750 |
| 5,497,490 | 3/1996 | Harada et al. | 395/700 |
| 5,544,356 | 8/1996 | Robinson et al. | 395/600 |
| 5,548,763 | 8/1996 | Combs et al. | 395/750 |

*Primary Examiner*—Jack B. Harvey
*Assistant Examiner*—Ario Etienne
*Attorney, Agent, or Firm*—Blakely, Sokoloff, Taylor & Zafman

[57] ABSTRACT

A method of allowing an operating system of a computer system to persist across a power off and on cycle is described. The method includes the step of detecting if the computer system is to be powered off. If the computer system is detected to be powered off, the state of the computer system is then preserved by storing data representing the state of the computer system in a designated area of a nonvolatile memory of the computer system. A system initialization code of the operating system is then replaced with new system initialization code that branches to restart code that accesses to the designated area of the nonvolatile memory such that when the computer system is again powered on, the restart code accesses the designated area of the nonvolatile memory for the data to restore the computer system to the state before the computer system was powered off.

15 Claims, 4 Drawing Sheets

5,710,930

APPARATUS AND A METHOD FOR ALLOWING AN OPERATING SYSTEM OF A COMPUTER SYSTEM TO PERSIST ACROSS A POWER OFF AND ON CYCLE

FIELD OF THE INVENTION

The present invention pertains to the field of computer systems. More particularly, this invention relates to an apparatus and a method for allowing an operating system of a computer system to persist across a power off and on cycle without requiring the operating system to be reloaded and reinitialized.

BACKGROUND OF THE INVENTION

A prior art personal computer system typically includes a microprocessor (also referred to as a central processing unit) that is coupled to several types of storage systems—namely, a read only memory ("ROM"), a random access memory ("RAM"), a hard (i.e., fixed) disk drive for mass storage, and a floppy disk drive or drives for storage on removable magnetic floppy disks. The prior personal computer system typically has an architecture that is especially geared to the storage system that forms a part of the prior personal computer system.

The prior art computer system also includes a basic input/output system ("BIOS") module that is stored in the ROM and used by the operating system of the prior art computer system. The BIOS module typically contains (1) drivers for certain hardware, including the keyboard, the disk drives, and the printer; (2) a power-on self-test program ("POST"); (3) a start-up routine that initializes the system; and (4) a BIOS loader program that reads the boot sector from a diskette or a hard disk and executes it.

The prior art computer system also includes an operating system. The operating system for the personal computer system processes commands, controls program execution, and oversees the hardware and software resources of the computer system. One type of prior art operating system is MS-DOS® sold by Microsoft Corporation of Redmond, Wash. The MS-DOS operating system includes a loader (i.e., MS-DOS loader) program stored in the boot sector of a hard drive or disk of the prior art computer system, a MS-DOS BIOS, a MS-DOS kernel, a user interface, and utility programs. Another type of prior art operating system is WINDOWS® sold also by Microsoft Corporation. The WINDOWS operating system is a multitasking operating system that requires the support of the MS-DOS operating system.

The startup (i.e., initialization or booting) process of a prior art computer system with the MS-DOS operating system typically includes the following steps. After the computer system is powered on, the POST program of the BIOS module stored in the ROM of the computer system is executed to test the system and the BIOS start-up routine stored in the ROM performs certain initialization functions. In addition, the BIOS loader program stored in the ROM reads the contents of the boot sector from a disk or from a hard drive into the RAM. As described above, the boot sector contains the MS-DOS loader program. The MS-DOS loader program then loads the MS-DOS BIOS (i.e., IO.SYS) file into the RAM. The MS-DOS BIOS file contains (1) MS-DOS drivers that extend and use components of the ROM BIOS drivers; (2) an initialization routine for the MS-DOS drivers; and (3) a MS-DOS specific (i.e., SYSINIT) loader program. The SYSINIT loader program then loads the rest of the operating system, initializes it, and displays the MS-DOS prompt. At this time, the computer system is ready to execute any application program selected by the user.

Disadvantages are, however, associated with such prior art computer system. One disadvantage associated is that the prior art computer system is required to repeat the start-up or booting process every time the computer system is powered on from its powered off state. This is due to the fact that the RAM employed in the prior art computer system loses all the information stored in it when the power supply is disconnected from the computer system. This causes the computer system to go through the start-up process again when power supply is connected back to the computer system. The operating system always reinitializes and reloads everything when the computer system is powered on.

Another disadvantage of the prior art computer system is that whenever the operating system is loaded into the RAM at the system power up, the prior art computer system can only be set up or initialized to a designed state of execution by the operating system. The operating system typically does not cause the prior art computer system to return to the state of execution where the prior art computer system was powered off.

SUMMARY OF THE INVENTION

One of the features of the present invention is to enable an operating system and running application programs of a computer system to persist across system power off and on cycles.

Another feature of the present invention is to enable a computer system to be restarted from the power off state without requiring to reload the operating system of the computer system or its application programs that were running before the computer system was powered off.

A further feature of the present invention is to provide an instant on feature to a computer system by avoiding reloading the operating system to a main memory of the computer system from a mass storage of the computer system.

A method of allowing an operating system of a computer system to persist across a power off and on cycle is described. The method includes the step of detecting when the computer system is to be powered off. If the computer system is detected to be powered off, the state of the computer system is then preserved by storing data representing the state of the computer system in a designated area of a nonvolatile memory of the computer system. A system initialization code of the operating system (i.e., loader program for the operating system called a bootstrap record) is then replaced with a new initialization code such that when the computer system is again powered on, the system initialization code accesses the designated area of the nonvolatile memory for the data to restore the computer system to the state before the computer system was powered off.

The system initialization code is replaced by (1) creating a new system initializing code of the operating system that causes the system state to be restored from the designated area of the nonvolatile memory and (2) storing the new system initialization code in a boot sector of a mass storage device of the computer system where the system initializing code is designated to be stored such that when the computer system is again powered on, the new system initialization code accesses the designated area of the nonvolatile memory for the data to restore the computer system to the state before the computer system was powered off. The computer system is then restored to the state before the computer system was powered off by accessing the designated area of the nonvolatile memory for the data when the computer system is again powered on.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
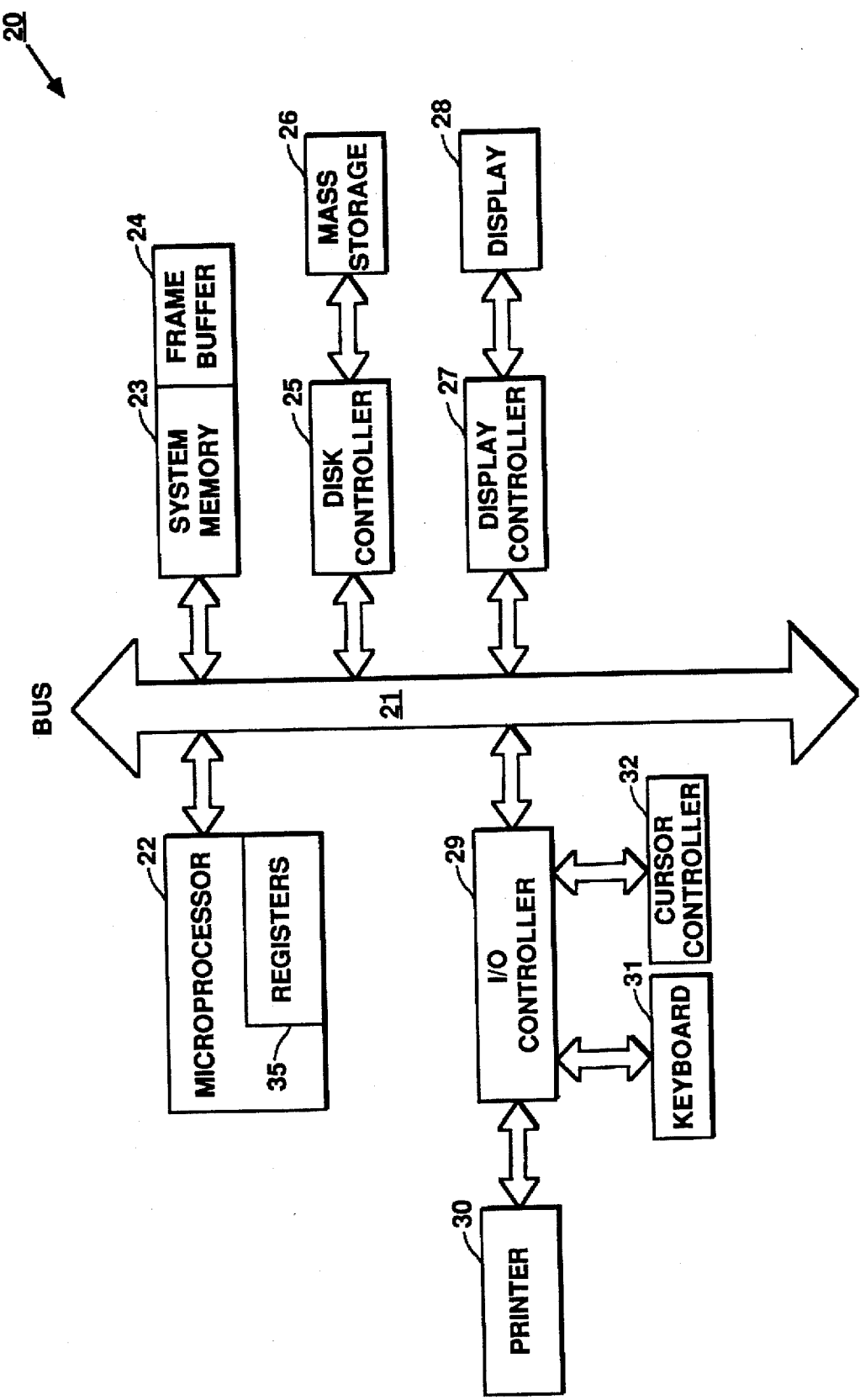
FIG. 1 illustrates a computer system that includes a shutdown program that implements one embodiment of the present invention.

FIG. 1 shows a computer system 20 that includes a nonvolatile memory as system memory and a shutdown program (not shown in FIG. 1) for allowing computer system 20 to persist across a power off and on cycle in accordance with one embodiment of the present invention.

Briefly, the shutdown program is executed every time computer system 20 is to be powered off. During execution, the shutdown program first saves the data currently stored in a frame buffer of the computer system into a designated area of a nonvolatile memory of the computer system. In addition, the shutdown program also stores the data currently held in various registers of a microprocessor of the computer system into the designated area of the nonvolatile memory. In one word, the shutdown program does all necessary state preserving functions to preserve the state of the computer system before the computer system is powered off. The shutdown program then creates a new system initialization code (i.e., loader program of the operating system) that contains code to cause a system state to be restored from the designated area of the nonvolatile memory via the shutdown program. The shutdown program then replaces the system initialization code currently stored in a boot sector of a mass storage device of the computer system with the new initialization code.

When the computer system is again powered on, the new initialization code is loaded into the system memory and is then executed. The new initialization code branches to the code in the shutdown program that accesses the designated area of the nonvolatile memory that stores the data representing the state of the computer system before it was turned off, the new initialization code is branched to access the designated area of the nonvolatile memory in order to restore the computer system to the exact state where the computer system was powered off. This allows the computer system to persist across the system power off and on cycle. In addition, this provides the computer system with the instant-on feature by avoiding reloading the operating system and other application programs into the system memory of the computer system every time the computer system is powered on. The shutdown program will be described in more detail below, also in conjunction with FIGS. 1–4.

For one embodiment, computer system 20 is a personal computer. For another embodiment, computer system 20 can be a notebook computer, a laptop computer, a minicomputer, a workstation computer, a mainframe computer, or any other computer or data processing system.

Computer system 20 includes a microprocessor 22 that can be any one of the x86 family of microprocessors sold by Intel Corporation of Santa Clara, Calif. Alternatively, microprocessor 22 can be other type of known microprocessor. Microprocessor 22 includes a number of registers 35. Registers 35 of microprocessor 22 store various data representing the state of execution of microprocessor 22 in running the operating system or executing an application program. Microprocessor 22 is connected to a bus 21. Microprocessor 22 serves as the central processing unit of computer system 20.

Bus 21 can be any kind of known bus system. For one embodiment, bus 21 is a peripheral component interconnect ("PCI") bus system. Alternatively, bus 21 can be an ISA (Industry Standard Architecture) bus system, an EISA (Extended ISA) bus system, a Micro Channel bus system, or any other known bus system.

Bus 21 is also connected to a system memory 23 and a frame buffer 24. System memory 23 is used in computer system 20 to store data and programs downloaded from a mass storage device of computer system 20 for execution by microprocessor 22. The programs stored in system memory 23 include application programs and the operating system of computer system 20.

System memory 23 can be formed by various types of nonvolatile and volatile memories, but is collectively nonvolatile for purposes of this invention. For one embodiment, system memory 23 includes a flash EPROM (i.e., flash erasable and electrically programmable read only memory). For another embodiment, system memory 23 includes a flash EPROM and a volatile memory such as RAM. In this case, the RAM in system memory 23 serves as a cache of the flash EPROM.

Figure 2:
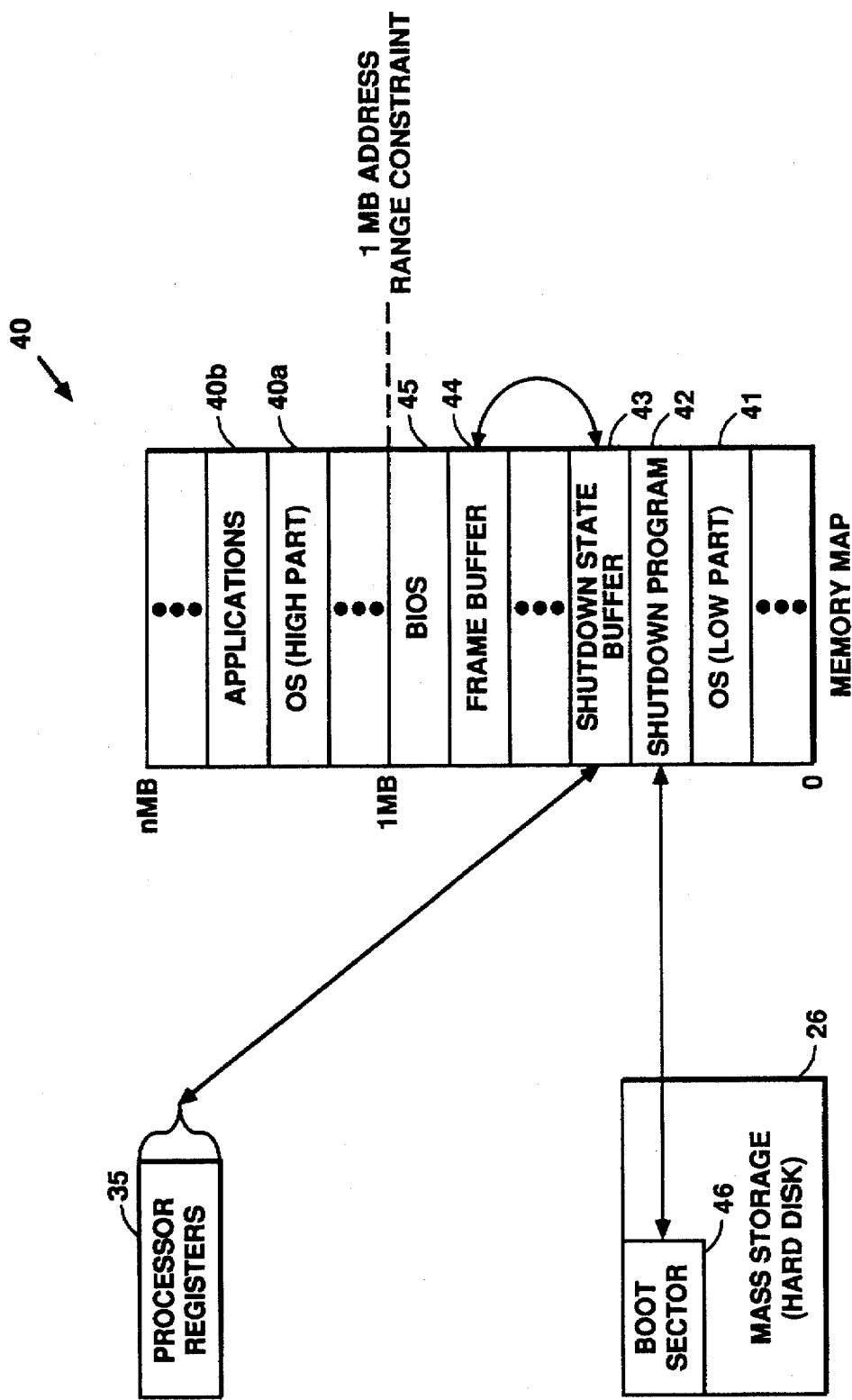
FIG. 2 shows the memory map of the system memory and frame buffer of the computer system of FIG. 1, wherein the shutdown program in accordance with one embodiment of the present application is stored in the system memory.

Frame buffer 24 is formed by a volatile memory (e.g., RAM). Frame buffer 24 is used in computer system 20 to store pixel data or bit-mapped image data for rendering images on a display 28 of computer system 20 or to be printed by a printer 30 of computer system 20. FIG. 2 shows the memory map of system memory 23 and frame buffer 24, which will be described in more detail below.

Referring to FIG. 2, system memory 23 includes a BIOS section 45 that stores a BIOS module. The BIOS module used in computer system 20 can be any known BIOS module.

The BIOS module typically includes (1) drivers for certain hardware of computer system 20, including keyboard, disk drives, printer; (2) a power-on self-test program (i.e., POST); a start-up routine that initializes the system; and (4) a BIOS loader program that reads a boot sector from a mass storage of computer system 20.

Referring back to FIG. 1, computer system 20 also includes a mass storage device 26, such as a hard disk, and a disk controller 25 which is coupled to system bus 21. Mass storage device 26 stores data and programs for execution by computer system 20. The programs stored typically include one or more operating systems, application programs, and utility programs. Mass storage device 26 is a nonvolatile storage device. However, the programs and data stored in mass storage device 26 are not directly executed out of mass storage device 26 and therefore need to be loaded into system memory 23 before being executed.

Mass storage device 26 includes a boot sector 46 (shown in FIG. 2). Boot sector 46 can be a first sector of mass storage device 26. Alternatively, boot sector 46 can be any sector of mass storage device 26.

Boot sector 46 is first accessed by the BIOS loader program of the BIOS module stored in BIOS section 45 of system memory 23 (see FIG. 2) whenever computer system 20 is powered on. Boot sector 46 stores an operating system loader program (i.e., initialization code) that, when loaded into system memory 23, loads the rest of an operating system of computer system 20. Boot sector 46 and the operating system loader program stored in it will also be described in more detail below, in conjunction with FIGS. 2–4.

Computer system 20 further includes a display controller 27 for processing image data to be imaged on display 28. As described above, the image data is stored in frame buffer 24 before being displayed on display 28. For one embodiment, display 28 is a computer monitor (e.g., CRT display or liquid crystal display). For another embodiment, display 28 is a television set (e.g., NTSC standard color television set).

Input and output of computer system 20 is also provided by an input/output controller 29 which may be one unit or several different units for controlling the input and output from/to printers such as printer 30, keyboards such as keyboard 31, and cursor control devices such as cursor controller 32. For one embodiment, printer 30 is a laser printer. Alternatively, printer 30 can be any other known "hard copy" display device such as inkjet printer, dot matrix printer, etc.

Computer system 20 also includes an operating system (not shown in FIG. 1 ). The operating system is typically stored in mass storage device 26. When computer system 20 is powered on, the operating system is loaded into system memory 23. The operating system is loaded into the nonvolatile memory of system memory 23.

For one embodiment, the operating system is the MS-DOS® operating system sold by Microsoft Corporation. For another embodiment, the operating system is the WINDOWS® operating system. Alternatively, the operating system can be any other known operating system. For example, the operating system can be an OS/2™ operating system sold by IBM Corporation of Armonk, N.Y., or a UNIX℧ operating system sold by AT&T of Murray Hill, N.J.

As described above, computer system 20 also includes the shutdown program. For one embodiment, the shutdown program is stored in the low address range (e.g., below a one megabyte address range) of system memory 23. For another embodiment, the shutdown program is stored anywhere in system memory 23.

The shutdown program is used in computer system 20 to allow computer system 20 to persist across a system power off and on cycle without requiring to change the operating system of computer system 20. The shutdown program allows computer system 20 to return to the state of execution at which computer system 20 was powered off. In addition, the shutdown program provides an instant-on feature to computer system 20 by avoiding reloading the operating system into system memory 23 whenever computer system 20 is powered on. This is also due to the fact that system memory 23 contains the nonvolatile memory that preserves the data stored in it when computer system 20 is powered off. As is known, the nonvolatile memory can keep the data stored in it absent of any power supply, but currently available operating systems will always reload themselves and their application programs. This behavior negates the value of having persistent memory in the computer system.

The shutdown program in accordance with one embodiment of the present invention takes the full benefit of using flash EPROM as system memory 23 and enables computer system 20 to be restarted from the power off state without requiring to reload the operating system and/or its application programs that were running at the time when computer system 20 was powered off. The shutdown program achieves this without changing the operating system. In addition, because the shutdown program causes the state of computer system 20 to be stored in the nonvolatile memory of system memory 23 when the shutdown of computer system 20 occurs, the shutdown program can, at the system power up of computer system 20, branch to the state where computer system 20 was left off.

As described above, system memory 23 stores the shutdown program and the operating system. FIG. 2 shows the memory map 40 of system memory 23 and frame buffer 24 of FIG. 1. As can be seen from FIG. 2, memory map 40 includes a frame buffer section 44 which represents frame buffer 24 of FIG. 1. Memory map 40 also includes a section 40b for storing application programs, a section 40a for storing the high part of the operating system. The low part of the operating system is stored in section 41 of memory map 40. The shutdown program is stored in a section 42 of memory map 40. In addition, memory map 40 also includes a shutdown state buffer section 43. Shutdown state buffer section 43 is designated to store the data representing the current state of computer system 20 right before it was turned off. The data typically includes the data stored in frame buffer 24, the data held in registers 35 of microprocessor 22, etc.

Shutdown state buffer 43 is located in the low memory address range (i.e., below the one megabyte address range) in system memory 23. Alternatively, shutdown state buffer 43 can be anywhere in system memory 23. As will be described in more detail below, shutdown state buffer 43 is created by the shutdown program.

Figure 3:
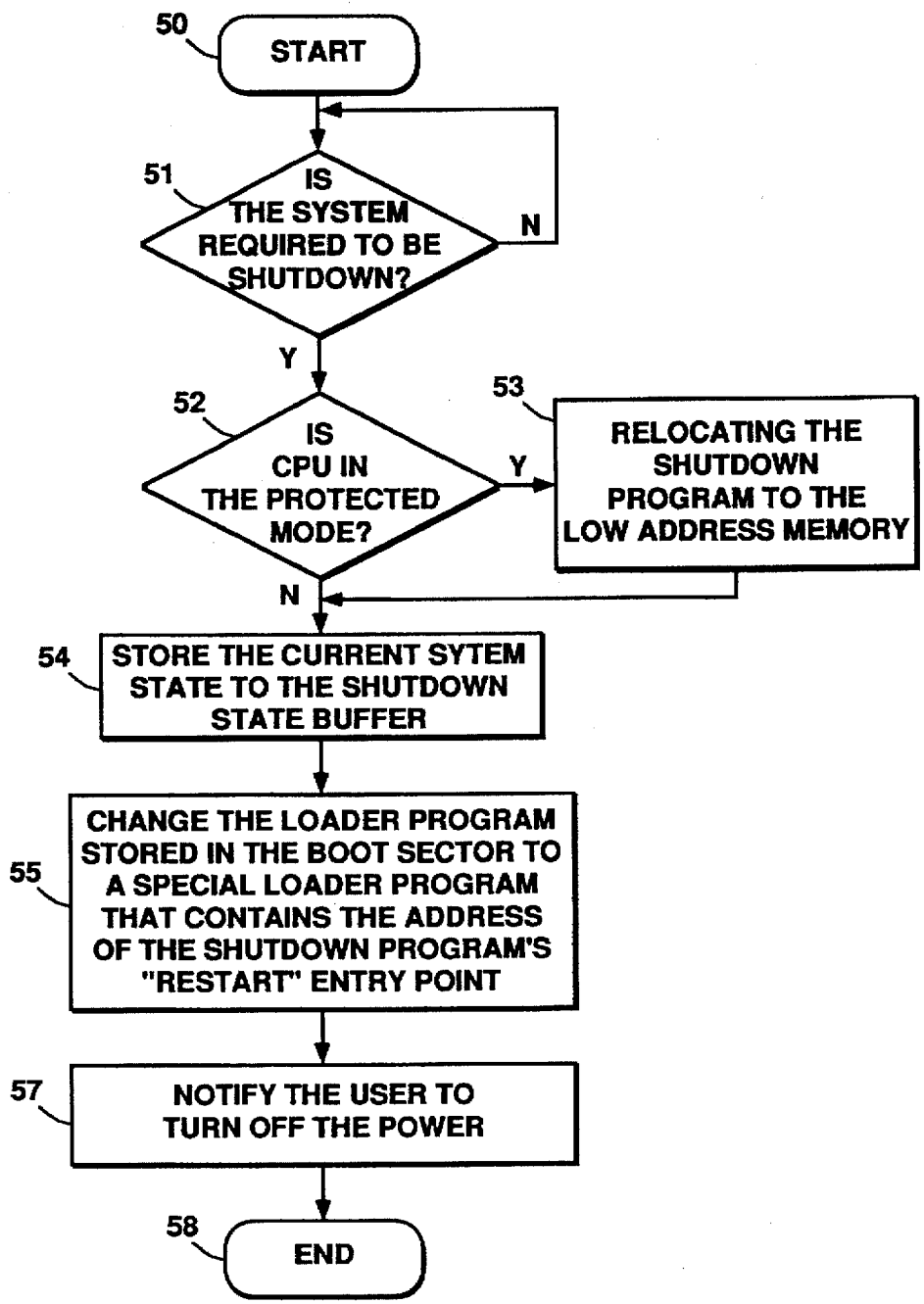
FIG. 3 shows in flow chart diagram a shutdown process of the shutdown program.

Referring to FIG. 3, the shutdown process of the shutdown program is shown in flow chart diagram. As shown in FIGS. 1–3, the process starts at step 50. At step 51, the process detects if computer system 20 is required to be turned off. For one embodiment, the detection is done by means of a "soft" power switch that, when turned off, causes an interrupt that in turn executes the shutdown program automatically. For another embodiment, the user manually runs the shutdown program before powering off the computer system. If the answer is no, step 51 is repeated until the answer is positive. If the answer is yes, step 52 is then performed at which it is determined whether microprocessor (i.e., CPU) 22 has been running in a protected mode. If the answer is yes, then step 53 is performed. If the answer is no, then step 54 is performed. Alternatively, the process does not contain steps 52 and 53.

At step 53, the shutdown program is relocated to or made sure to be in the low address memory (i.e., lower than the one megabyte address range constraint) of system memory 23. The process then goes to step 54. At step 54, the current system state of computer system 20 is stored in shutdown state buffer 43 (see FIG. 2). As described above, the current system state of computer system 20 typically includes data stored in frame buffer 24, data held in various registers 35 of microprocessor 22, etc. The shutdown program also saves a copy of the operating system loader program in the shutdown state buffer. In addition, the shutdown program also retains shutdown state buffer 43. The process then moves to step 55. At step 55, the loader program (i.e., initialization code) stored in boot sector 46 of mass storage device 26 is replaced with a new loader program. The new loader program is created by the shutdown program of the present invention that contains the address to the shutdown program's "restart" entry point. This means that the new loader program contains the "restart" entry address of the shutdown program and will branch to the shutdown program at system power up. The shutdown program, when executed, will access shutdown state buffer 43 (FIG. 2) for the data representing the state of computer system 20 before power-off. The shutdown program then sends the system state data to frame buffer 24, registers 35, etc. to restore computer system 20 to the state where it was powered off. The process then moves to step 57.

At step 57, the user is notified that computer system 20 can now be turned off. If shutdown detection (step 51) was done by "soft" power switch, then step 57 can be skipped and the shutdown program turns the computer off via software means. The process then ends at step 58.

Figure 4:
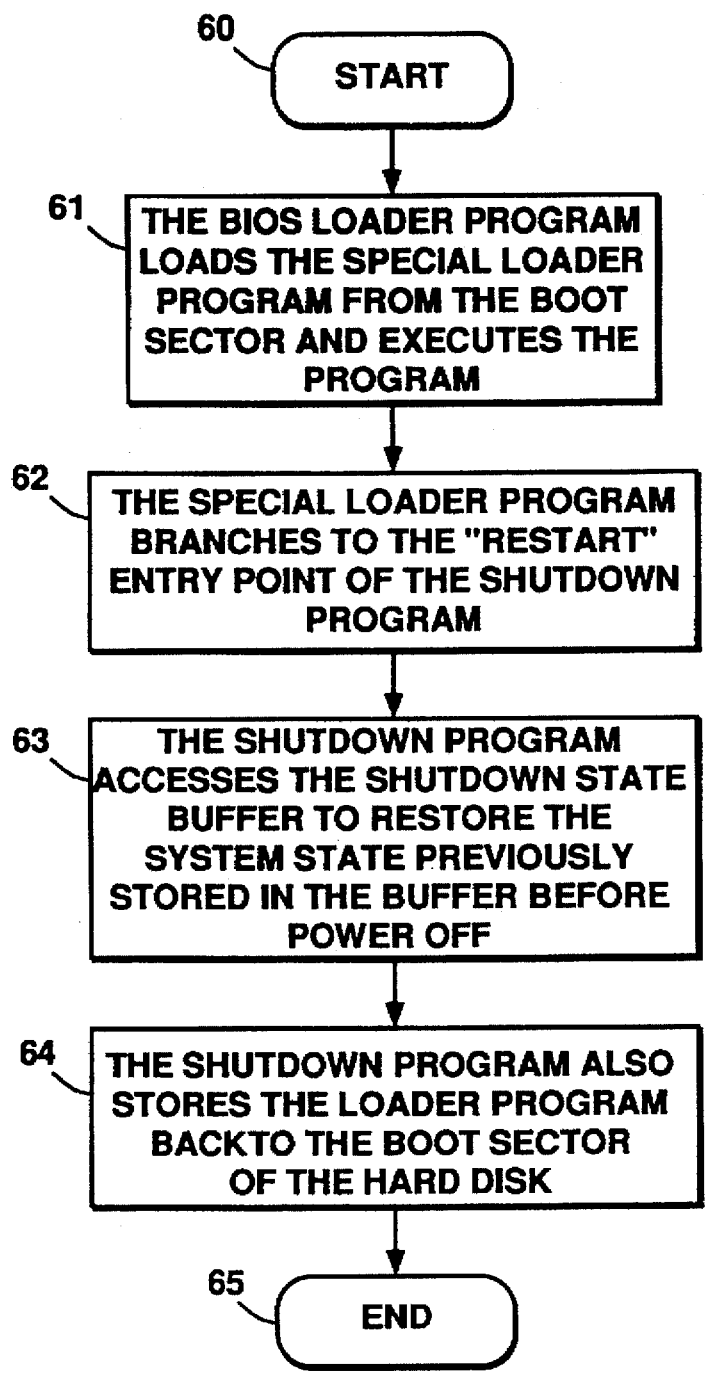
FIG. 4 shows in flow chart diagram a power-on process of the shutdown program.

Referring to FIG. 4, the restart process of the shutdown program is shown in flow chart diagram. As shown in FIGS. 1–2 and 4, the process starts at step 60. At step 61, the BIOS loader program loads the special loader program from boot sector 46 of mass storage device 26 into system memory 23. At step 62, the special loader program branches to the "restart" entry point of the shutdown program. At step 63, the shutdown program accesses shutdown state buffer 43 in system memory 23 to restore the system state of computer system 20. This step can be done using any known restoring technique. At step 64, the shutdown program also stores the original operating system loader program back into boot sector 46 of mass storage device 26. Alternatively, step 64 can be omitted. The process then ends at step 65.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of allowing an operating system of a computer system to persist across a power off and on cycle, comprising the steps of:

(A) detecting if the computer system is to be powered off;

(B) preserving a state of the computer system by storing data representing the state of the computer system in a designated area of a nonvolatile memory of the computer system when the computer system is detected to be powered off;

(C) replacing a system initialization code of the operating system so as to branch to a state restore code that accesses the designated area of the nonvolatile memory such that when the computer system is again powered on, the restore code accesses the designated area of the nonvolatile memory for the data to restore the computer system to the state before the computer system was powered off.

2. The method of claim 1, wherein the step (C) further comprises the steps of:

(i) creating a new system initialization code of the operating system that branches to the restore code to access the designated area of the nonvolatile memory; and (ii) storing the new system initialization code in a boot sector of a mass storage device wherein the system initializing code is designated to be stored.

3. The method of claim 2, further comprising the step of storing the replaced system initialization code in the nonvolatile memory such that the operating system is not changed.

4. The method of claim 3, further comprising the step of restoring the computer system to the state before the computer system is powered off by executing the new system initialization code to access the designated area of the nonvolatile memory for the data when the computer system is again powered on.

5. The method of claim 4, further comprising the step of storing the replaced system initialization code back into the boot sector of the mass storage after the new system initialization code has been executed to obtain the data from the designated area of the nonvolatile memory.

6. The method of claim 1, wherein the nonvolatile memory is electrically erasable and programmable.

7. In a computer system having a nonvolatile memory and an operating system, a method of allowing the operating system to persist across a system power off and on cycle, comprising the steps of:

(A) detecting if the computer system is to be powered off;

(B) preserving a state of the computer system by storing data representing the state of the computer system in a designated area of the nonvolatile memory if the computer system is detected to be powered off;

(C) changing a system initialization code of the operating system by (i) creating a new system initialization code of the operating system that stores an entry address to a code for restoring the system state from the designated area of the nonvolatile memory;

(ii) storing the new system initialization code in a boot sector of a mass storage device of the computer system where the system initialization code is designated to be stored such that when the computer system is again powered on, the new system initialization code causes access to the designated area of the nonvolatile memory for the data to restore the computer system to the state before the computer system was powered off; and (D) restoring the computer system to the state before the computer system was powered off by accessing the designated area of the nonvolatile memory for the data when the computer system is again powered on.

8. The method of claim 7, further comprising the step of storing the replaced system initialization code in the nonvolatile memory such that the operating system is not changed.

9. The method of claim 8, further comprising the step of storing the system initialization code back into the boot sector after the new system initialization code has been executed to obtain the data from the designated area of the nonvolatile memory.

10. The method of claim 7, wherein the nonvolatile memory is electrically erasable and programmable.

11. In a computer system having a nonvolatile memory and an operating system, an apparatus of allowing the operating system to persist across a power off and on cycle, comprising:

(A) means for detecting if the computer system is to be powered off;

(B) means for preserving a state of the computer system by storing data representing the state of the computer system in a designated area of the nonvolatile memory when the means for detecting detects that the computer system is to be powered off;

(C) means for changing a system initialization code of the operating system to branch to a restore code such that when the computer system is again powered on, the restore code accesses the designated area of the nonvolatile memory for the data to restore the computer system to the state before the computer system was powered off.

12. The apparatus of claim 11, wherein the means for changing further comprises:
   (i) means for creating a new system initialization code of the operating system that branches to the restore code to access the designated area of the nonvolatile memory; and
   (ii) means for storing the new system initialization code in a boot sector of a mass storage device of the computer system where the system initializing code is designated to be stored, and for storing the replaced system initialization code in the nonvolatile memory such that the operating system is not changed.

13. The apparatus of claim 12, further comprising means for restoring the computer system to the state before the computer system is powered off by executing the new system initialization code to branch to the restore code that accesses the designated area of the nonvolatile memory for the data when the computer system is again powered on.

14. The apparatus of claim 13, further comprising means for storing the system initialization code back into the boot sector of the mass storage device after the new system initialization code has been executed to obtain the data from the designated area of the nonvolatile memory.

15. The apparatus of claim 11, wherein the nonvolatile memory is electrically erasable and programmable.

\* \* \* \* \*